Oct. 12, 1954  E. J. W. DEMLO  2,691,454
WHEEL MOUNTING DEVICE
Filed March 17, 1950  2 Sheets-Sheet 1
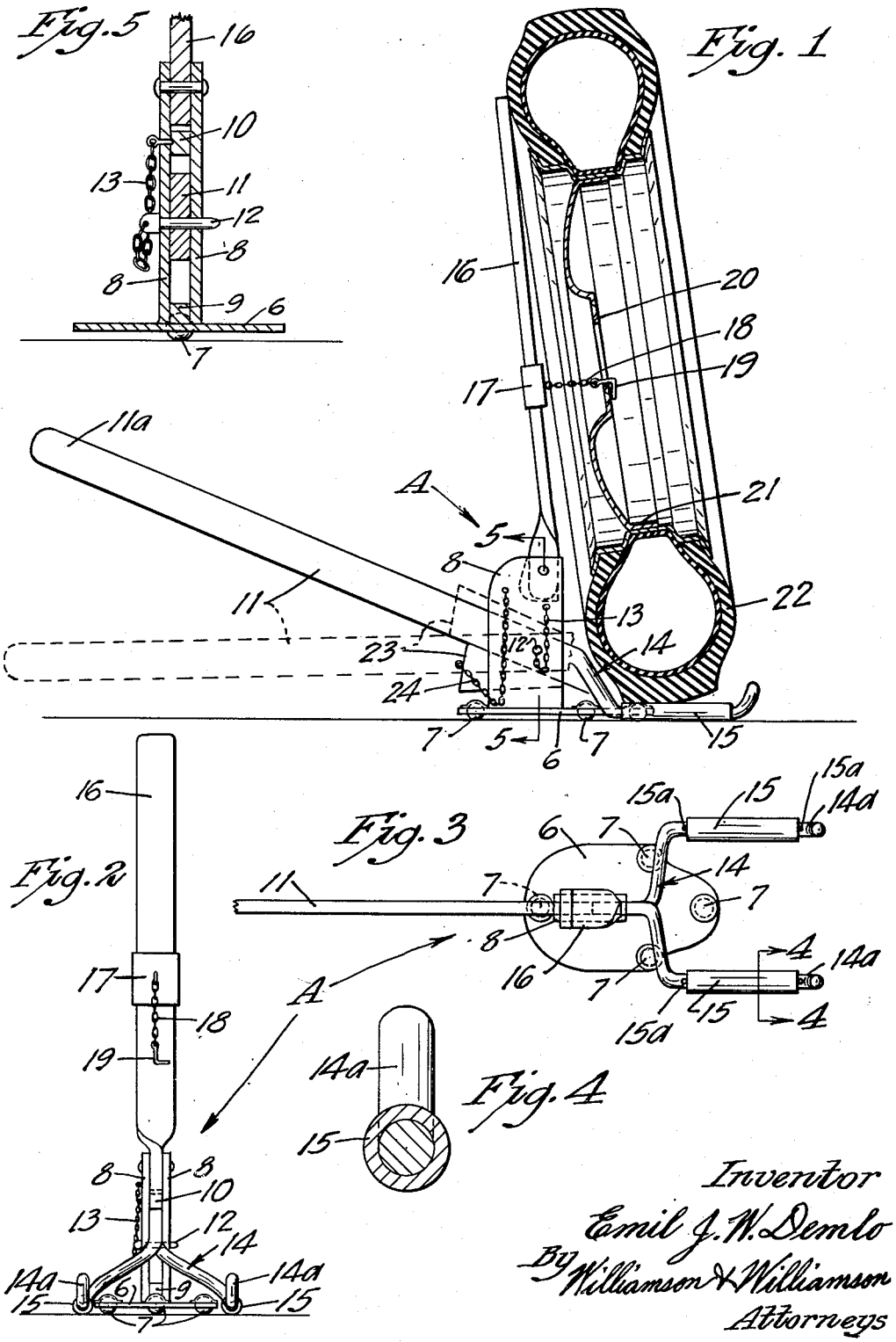
Inventor
Emil J. W. Demlo
By Williamson & Williamson
Attorneys Oct. 12, 1954  E. J. W. DEMLO  2,691,454
WHEEL MOUNTING DEVICE
Filed March 17, 1950  2 Sheets-Sheet 2
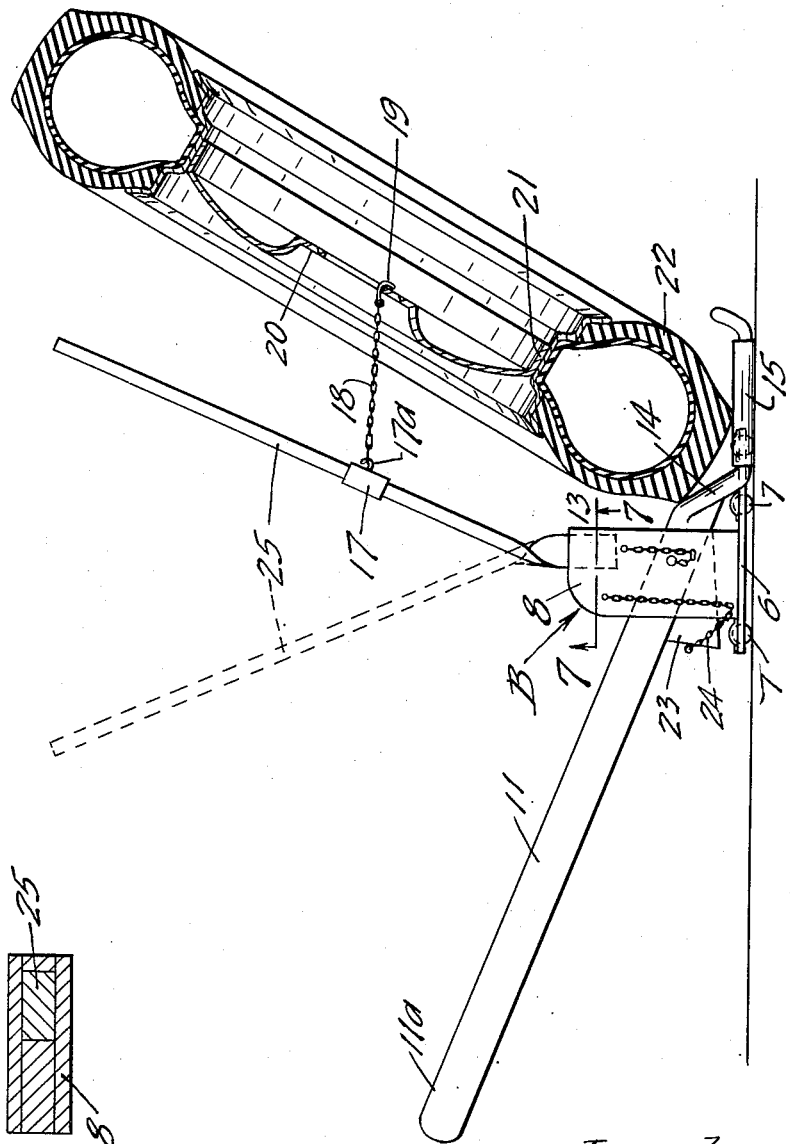
Inventor
Emil J. W. Demlo
By Williamson & Williamson
Attorneys Patented Oct. 12, 1954

2,691,454

UNITED STATES PATENT OFFICE 2,691,454

WHEEL MOUNTING DEVICE

Emil J. W. Demlo, Huron, S. Dak.

Application March 17, 1950, Serial No. 150,174

4 Claims. (Cl. 214—332)

This invention relates to wheel mounting devices and particularly to a device for facilitating mounting of a tire-equipped vehicle wheel on a vehicle.

In the past it has been a difficult problem to mount heavy tire-equipped vehicle wheels onto the vehicle hub due to the relatively heavy weight of the wheel and the difficulty in aligning the studs with the apertures. Several devices have been developed but none of these devices supports the upper portion of the vehicle wheel, and therefore necessitates holding the upper portion thereof by hand.

It is an object of my invention to provide a wheel mounting device adapted to carry a tire-equipped vehicle wheel and to support the upper portion thereof as well as the lower portion to leave the operator's hands free to adjust the position of the wheel and align the apertures with the studs.

More specifically, it is an object to provide a forked lever for supporting the lower portion of a tire-equipped wheel and having cooperatively associated therewith an upstanding stabilizing member adapted to be connected to an upper portion of the wheel to stably hold said wheel in said forked cradle while aligning the apertures of the wheel with the attachment studs of the vehicle hub.

It is still a further object to provide a pivoted lever having a forked wheel-supporting cradle at one end and a gripping handle at the other end to facilitate elevating a tire-equipped vehicle wheel and having cooperatively associated with said lever an upstanding stabilizing element adapted to be attached to a vehicle wheel and being pivotally mounted to permit the upper portion of the wheel to be swung inwardly toward the hub after alignment of the apertures with the attachment studs.

These and other objects and advantages of the invention will more fully appear from the following description made in connection with the accompanying drawings wherein like reference characters refer to the same or similar parts throughout the several views, and in which:

Fig. 1 is a central vertical sectional view taken substantially through the center of a tire-equipped vehicle wheel showing my mounting device in elevation with the wheel elevating lever in lowered position in full lines and in wheel-elevating position in dotted lines;

Fig. 2 is a front end elevational view of my mounting device;

Fig. 3 is a top plan view of the device shown in Fig. 2;

Fig. 4 is a transverse vertical sectional view taken substantially along the line 4—4 of Fig. 3;

Fig. 5 is a vertical sectional view taken substantially along the line 5—5 of Fig. 1;

Fig. 6 is a side elevational view of an alternative embodiment of my invention; and Fig. 7 is a fragmentary horizontal view taken substantially along the line 7—7 of Fig. 6.

As illustrated in Figs. 1-4 inclusive in the accompanying drawings, I provide a device for facilitating the mounting of tire-equipped vehicle wheels onto the vehicle hub. This form of my device is designated by the letter A, and consists in a supporting structure which in the form shown is a base 6 having four ball castor wheels mounted therein. A pair of upstanding webs 8 are rigidly connected to the base 6 in upstanding spaced generally parallel relation. A spacer plate 9 is interposed between the lower portions of the webs 8 and a substantially L-shaped spacer and abutment member 10 is interposed between the upper portions of said webs.

A wheel-supporting lever 11 is pivotally mounted between said spacers 9 and 10 on the removable pivot pin 12. A chain 13 loosely attaches said pin 12 to the upstanding web structure and prevents the same from becoming lost.

One end of the lever 11 has a gripping handle 11a formed thereon and the other end has a tire-engaging fork designated as an entirety by the numeral 14 and having a pair of spaced arms 14a. Each of the arms 14a has an upturned retaining lug formed thereon and each arm 14a has also a roller 15 journalled thereon. Suitable means for preventing longitudinal shifting of the rollers 15, such as the pins 15a, may be provided. An upstanding stabilizing member 16 is pivotally mounted between the upper opposed portions of the webs 8 as best shown in Figs. 1 and 5. The upper spacer 10 is recessed to permit forward swinging movement of the upper part of the stabilizer bar 16 and the lower end of said bar is rounded to also facilitate said forward swinging movement. The upper portion of the spacer 10 forms an abutment to limit the rear swinging movement of the bar 16. A sleeve 17 is slidably mounted on said bar and a chain 18 is connected to said sleeve. A hook 19 is connected at the outer end of said chain to permit attachment to an intermediate portion of the vehicle wheel, preferably by being hooked through the annular hub receiving flange 20 of the wheel, as best shown in Fig. 1.

The vehicle wheel and rim are designated by the numeral 21 and the tire mounted thereon is designated by the numeral 22. A wedge 23 is mounted on one of the webs 8 as by the chain 24 and is adapted to position the lever 11 in either raised position as shown by dotted lines or in lowered position as shown by full lines in Fig. 1. To facilitate mounting a tire-equipped wheel in the cradle 14, the wedge 23 is placed under the lever 11 between said lever and the lower spacer plate 9 as best shown in the full line view of Fig. 1. This holds the cradle 14 in extreme lowered position and permits easy rolling of the wheel between the arms thereof. When the wheel is so mounted the hook 19 is engaged around the annular flange at the center of said wheel to hold the upper portion of the wheel against the stabilizer bar 16. This leaves the two hands of the operator free to adjust the position of the wheel apertures relative to the studs of the vehicle hub and permits accurate alignment of the apertures with the studs. When a substantial vertical alignment has been reached the wedge 23 is removed from below the lever 11 and the lever is shifted on its pivot to elevate the cradle 14 and the wedge re-inserted in the desired elevated position as shown by the dotted lines of Fig. 1. When the apertures have been aligned with the studs the stabilizing member 16 is swung on its pivot to shift the wheel inwardly toward the hub and to mount the flange 20 onto the studs of the hub.

In the form of the invention shown in Figs. 6 and 7 and designated by the letter B the stabilizing bar 16 instead of being pivoted to the webs 8 is merely removably received in a slot formed between said two webs and is designated by the numeral 25. The sliding sleeve 17, as shown in Fig. 1, is similarly mounted thereon and a flexible attachment member such as the chain 18 with a hook 19 connected at the end thereof is adjustably connected to the sleeve 17 as by the hook 17a. In certain vehicles the rear fenders cover substantially the entire rear wheel, thus making it extremely difficult to mount a tire thereon. Form B of my invention is designed to solve this problem by permitting the tire-equipped wheel 21 to be tilted forwardly toward the hub of the vehicle before being inserted under the fender. This lowers the top of the wheel and permits the same to be shifted under the fender prior to being raised by the lever 11. The adjustment of the length of the chain 18 permits the angle of the wheel to be easily and quickly varied. It should be noted by the dotted position of the stabilizing member 16 that the same can be removed and turned to slope so that the main portion thereof slopes rearwardly instead of forwardly, as shown in the full line position. This may be desirable for certain types of vehicles.

It will be seen that I have provided a relatively simple yet highly efficient device designed to facilitate mounting a vehicle wheel onto the vehicle and which combines a roller equipped cradle to permit easy rotation of a wheel supported thereon with a pivoted lever for elevating the wheel and the stabilizing member for securely holding the upper portion of the wheel in the desired position relative to the hub on which the same is to be mounted while freeing both hands of the operator for adjustment of the wheel positions.

It will, of course, be understood that various changes may be made in the form, details, arrangement and proportions of the various parts without departure from the scope of the present invention, which, generally stated, consists in the matter shown, and described, and set forth in the appended claims.

What I claim is:

1. A device for facilitating the mounting of a wheel on a vehicle, said device comprising a base adapted to be shifted over a flat surface, an elongated wheel elevating lever pivotally mounted on said base, a tire-receiving cradle formed at one end of the lever and an operating handle at the other end thereof, and an upstanding wheel stabilizing member pivotally mounted relative to said base for swinging movement independently of said lever and means for interconnecting said upstanding stabilizing member, and an intermediate portion of said vehicle wheel.

2. A device for facilitating the mounting of a tire-equipped wheel on a vehicle, said device comprising a supporting base structure adapted to be moved on a supporting surface, an elongated elevating lever pivotally mounted on said structure for swinging movement on a horizontal axis, a tire-receiving cradle formed at one end of said lever and an operating handle formed at the other end thereof, an upstanding stabilizing member mounted on said supporting structure, and a wheel attachment element mounted for free shifting movement on said stabilizing member to permit shifting thereof when said elevating lever is swung on its axis.

3. A device for facilitating the mounting of a tire-equipped wheel on a vehicle, said device comprising a supporting base structure adapted to be moved on a supporting surface, an elongated elevating lever pivotally mounted on said structure for swinging movement on a horizontal axis, a bifurcated tire-receiving cradle formed at one end of said lever and an operating handle formed at the other end thereof, a pair of upstanding web members extending upwardly from said base structure in closely spaced parallel relation, an upstanding stabilizing member having a bend formed therein and removably mounted between said web members, means for providing support for said upstanding member, and a flexible extensible wheel attachment element mounted for free shifting movement longitudinally of said stabilizing member.

4. A device for facilitating the mounting of a wheel on a vehicle hub, said device comprising a base mounted for sliding movement on the underlying supporting surface, an upstanding supporting structure fixed to said base and extending upwardly therefrom, an elongated elevating lever pivotally mounted on said upstanding structure in spaced relation above said base, a wheel receiving cradle formed at one end of said lever and adapted to receive the lower peripheral portion of a wheel therein, an operating handle formed at the other end of said lever, said upstanding structure having an opening formed therein above said pivot point and a fixed stop member forming the upper extremity of said opening in spaced relation above said pivot to receive a positioning member between said fixed stop member and an intermediate portion of the upper side of said lever, a cradle positioning stop member constructed of a size and shape to be received in said opening to positively hold said lever and said cradle at the desired elevation to produce the desired positioning of a wheel carried by said cradle, and an upstanding rearwardly sloping stabilizing wheel-engaging member mounted on said upstanding support and extending upwardly therefrom to provide lateral support for a wheel carried by said cradle.

References Cited in the file of this patent

UNITED STATES PATENTS

| Number | Name | Date |
|---|---|---|
| 1,378,582 | Chipps | May 17, 1921 |
| 1,957,126 | Appel | May 1, 1934 |
| 2,525,437 | Winzler et al. | Oct. 10, 1950 |
| 2,538,473 | Russell et al. | Jan. 16, 1951 |

FOREIGN PATENTS

| Number | Country | Date |
|---|---|---|
| 642,021 | Germany | Feb. 20, 1937 |